(12) United States Patent
Altendorf

(10) Patent No.: US 6,183,072 B1
(45) Date of Patent: Feb. 6, 2001

(54) SEAL USING GASKET COMPRESSED NORMAL TO ASSEMBLY AXIS OF TWO PARTS

(75) Inventor: John M. Altendorf, Corvallis, OR (US)

(73) Assignee: Hewlett-Packard Company, Palo Alto, CA (US)

(*) Notice: Under 35 U.S.C. 154(b), the term of this patent shall be extended for 0 days.

(21) Appl. No.: 09/070,132

(22) Filed: Apr. 29, 1998

(51) Int. Cl.$^7$ .................................................. B41J 2/175
(52) U.S. Cl. ............................................................ 347/85
(58) Field of Search ................................ 347/85, 86, 87

(56) References Cited

U.S. PATENT DOCUMENTS

| | | | |
|---|---|---|---|
| 4,568,954 | 2/1986 | Rosback | 347/86 |
| 4,771,298 * | 9/1988 | Lee et al. | 347/68 |
| 4,841,310 | 6/1989 | Hoffman | 346/75 |
| 5,103,243 | 4/1992 | Cowger | 347/87 |
| 5,365,262 | 11/1994 | Hattori et al. | 347/87 |
| 5,408,256 | 4/1995 | Keen et al. | 347/87 |
| 5,435,961 | 7/1995 | Micciche | 264/319 |
| 5,448,275 | 9/1995 | Fong | 347/87 |
| 5,610,644 | 3/1997 | Timm, Jr. et al. | 347/87 |
| 5,619,239 | 4/1997 | Kotaki et al. | 347/86 |
| 5,642,144 | 6/1997 | Plotkin | 347/87 |
| 5,659,345 | 8/1997 | Altendorf | 347/87 |
| 5,663,753 | 9/1997 | Story et al. | 347/86 |
| 5,666,146 * | 9/1997 | Mochizuki et al. | 347/86 |
| 5,671,001 | 9/1997 | Elliot et al. | 347/87 |
| 5,680,164 | 10/1997 | Miller et al. | 347/87 |
| 5,684,521 | 11/1997 | Salter et al. | 347/87 |
| 5,719,609 * | 2/1998 | Hauck et al. | 347/85 |
| 5,917,523 * | 6/1999 | Baldwin et al. | 347/85 |
| 5,958,342 * | 9/1999 | Gamble et al. | 422/100 |

FOREIGN PATENT DOCUMENTS

| | | | |
|---|---|---|---|
| 633138A2 | 1/1995 | (EP) | B41J/2/175 |
| 98/55322 | 12/1998 | (WO) | B41J/2/175 |

OTHER PUBLICATIONS

"Injection Molds And Molding–A Practical Manual", Second Edition; by: Joseph B. Dym; Copyright 1987 by Van Nostrand Reinhold Company, Inc; 5 pages.

* cited by examiner

Primary Examiner—N. Le
Assistant Examiner—Michael Nghiem
(74) Attorney, Agent, or Firm—Timothy F. Myers

(57) ABSTRACT

An inkjet storage container sealing mechanism is comprised of a cover, a receptacle, a gasket compressed normal to its insertion and a support member to maintain a seal that is resistant to ink and air penetration. The receptacle has sidewalls that form an opening. A gasket is stretched over a portion the cover, then the gasket and the portion of the cover is inserted into the opening of the receptacle. The gasket forms a seal between the cover and the receptacle. The compressive forces acting on the gasket to form the seal do not contribute additional forces to a mechanical joining mechanism, which attaches the cover to the receptacle. The support member prevents the sidewalls of the receptacle from deflecting to help maintain the seal.

10 Claims, 13 Drawing Sheets

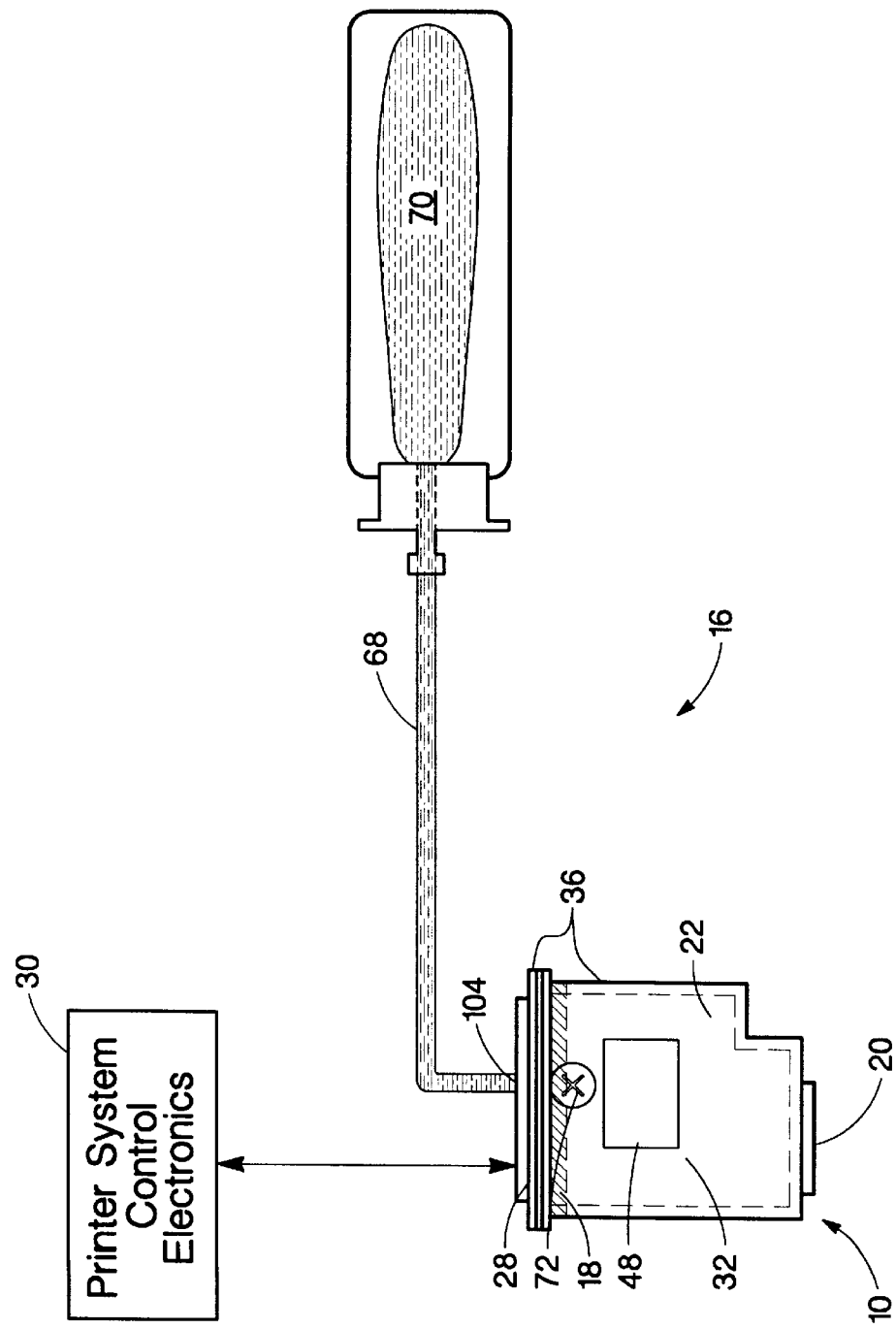

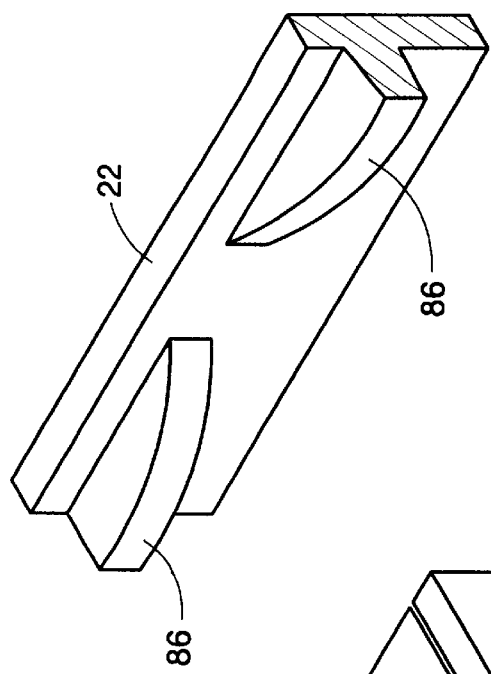
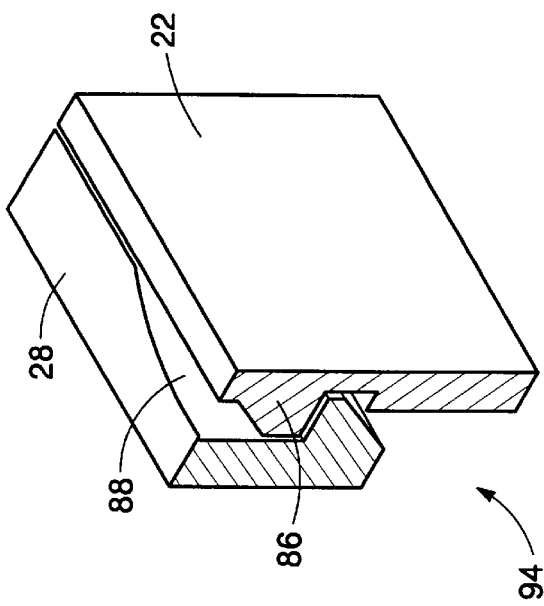
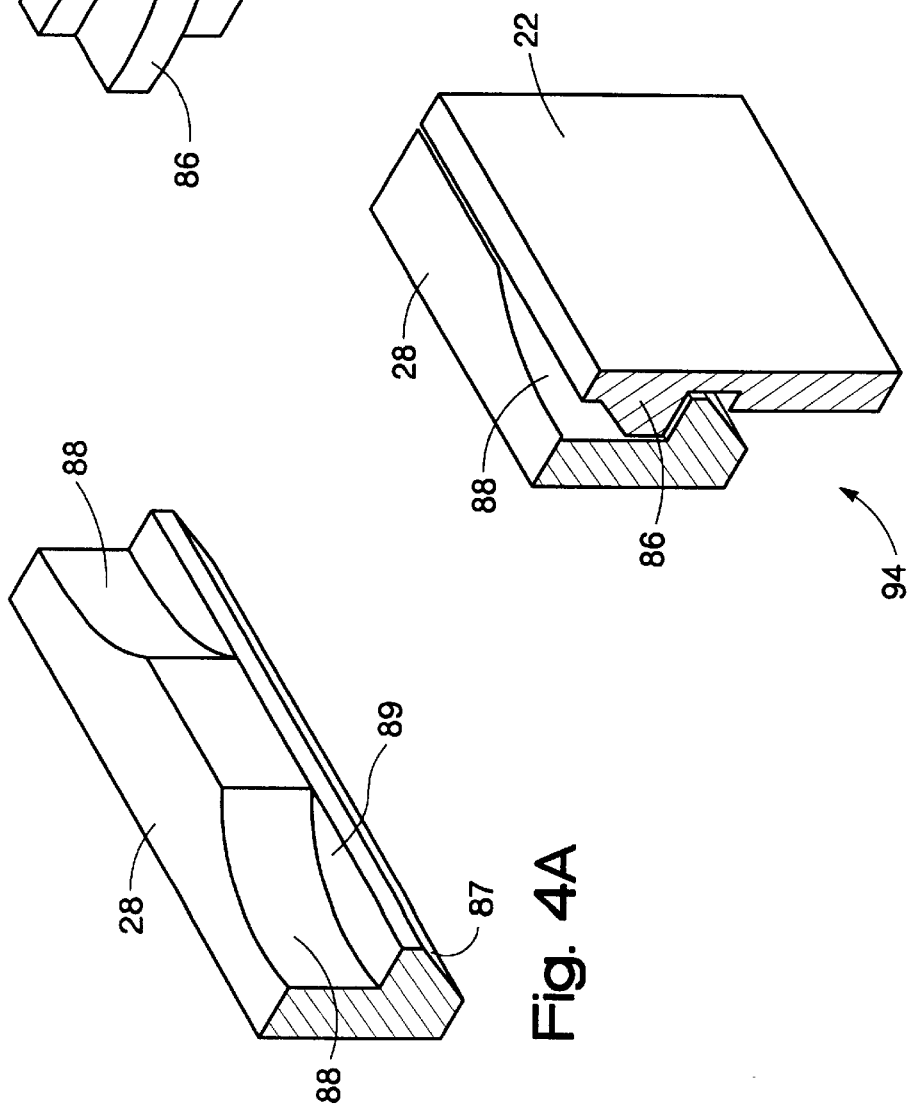
Fig. 4B
Fig. 4C
Fig. 4A

SEAL USING GASKET COMPRESSED NORMAL TO ASSEMBLY AXIS OF TWO PARTS

BACKGROUND OF THE INVENTION

This invention generally relates to inkjet printing. More particularly, this invention relates to the sealing and assembly of a container used to store and deliver ink to an inkjet printhead, by which the invention provides a robust solution to needs for today's products, such as replacing or repairing ink delivery systems.

Many printers today use inkjet pens to produce recorded media. The inkjet pens have a container used to store and deliver ink to the printhead. The containment of the ink is usually done at a partial vacuum in the range of 0.5 to 9.0 inches of water column to prevent leakage of ink from the printhead. It is undesirable to allow ink to penetrate a seal between different pen parts that create this containment body. Likewise, it is also undesirable to allow air to intrude the containment body through the seal. In addition, the seal technique used should not be permitted to degrade the ink within the container, such as by the seal corroding due to a reaction with the ink. To allow for easy maintenance of assembly processes, it is desirable to have the sealing function be highly consistent and reliable in its manufacture. An additional feature desired in a seal design is the ability to seal, unseal and reseal without degradation of the seal's properties. This feature would permit new processes to be used to repair or modify an inkjet pen.

One current approach to sealing members on inkjet pens is to use an adhesive.

However, most adhesives and their resultant seals degrade when exposed to the ink. In addition, many adhesives have also been shown to contaminate the ink. Other manufacturing problems are related to the time it takes adhesives to cure, thus limiting throughput, and the inconsistency of seals on separate containers due to the variation of adhesive formulations from lot to lot. Although using heat can accelerate the curing time of an adhesive, the heat often causes other parts of the pen to become damaged. In addition, damage to the sealing members occurs when the adhesive joint is broken, thus preventing one from repairing a malfunctioning inkjet pen.

Ultrasonic welding is a second approach used on contemporary inkjet pens to seal members. This technique requires the materials of the two parts being sealed to be ultrasonically compatible which is not always desirable or even possible for a given application. The high frequency energy, used to heat and melt the plastic, often causes damage to other parts of the pen. To perform the ultrasonic welding properly, the parts need to be precisely supported during the weld thereby requiring expensive tooling fixtures. In addition, to ensure consistency and quality of the weld joints, there must be significant planarity between the welding surfaces, which requires tight part tolerances, thus making them more expensive. Many times energy directors are molded into the plastic to increase the likelihood of welding a good seal. These energy directors are usually delicate part features that are easily damaged. Once an ultrasonic seal is broken, it is virtually impossible to reseal properly and this prevents repairing a malfunctioning inkjet pen.

A third approach used is a face seal gasket between the mating parts. The face seal gasket requires that the mechanical joining function of the mating parts react to a constantly applied load from the face seal gasket. This force requires the surfaces on each side of the face seal gasket be smooth and rigid, thus increasing the part cost. In addition, there must be a continuous attachment mechanism or one that has frequent points of attachment to keep the joining surfaces flat. If the attachment mechanisms are exposed to the ink, they may degrade. In addition, if there is a preexisting stress in an attachment point, it may fail after a prolonged period in which it has been subjected to the gasket force, thus causing an early failure of the seal.

There is a need for an attachment and sealing process that is suitable for low cost, high volume manufacturing processes such as those used in assembling inkjet pens. A new seal design must allow for less expensive components, more efficient processes, and high volume manufacturing that provides better consistency, quality and reliability of the finished product. The ability to make repeated seals and reseals without degradation would allow an inkjet pen to be repaired or modified. Furthermore, a new seal design also needs to: allow for parts having looser tolerances; withstand attack from many different types of ink; allow for the attachment joint to not be in contact with the ink; and be virtually independent to the use of different plastic molding material. Other concerns a new seal design should address are: saving capital tooling costs required to build production lines, minimizing the size of production lines, and preventing process induced damage to other parts of the pen which might go undetected during manufacturing and later become field failures.

SUMMARY OF THE INVENTION

An inkjet storage container sealing mechanism is comprised of a cover, a receptacle, a gasket compressed normal to its insertion and a support member to maintain a seal that is resistant to ink and air penetration. The receptacle has sidewalls that form an opening. The gasket is stretched over a portion of the cover; then the gasket and the portion of the cover are inserted into the opening of the receptacle. The gasket forms a seal between the cover and the receptacle. The compressive forces acting on the gasket to form the seal do not contribute additional forces to a mechanical joining mechanism, which attaches the cover to the receptacle. The support member of the cover prevents the sidewalls of the receptacle from deflecting. This support member helps maintain the gasket seal.

BRIEF DESCRIPTION OF THE DRAWINGS

FIG. 1 schematically depicts an exemplary embodiment of a printing system.

FIG. 4A illustrates the receiving detail in one member of the ink jet cartridge used in a snap joint attaching mechanism.

FIG. 4B illustrates the snap detail in one member of the ink jet cartridge used in a snap joint attaching mechanism.

FIG. 4C illustrates the receiving and snap details when mating the two members.

FIG. 5A illustrates the dis-attachment of an inkjet cartridge.

FIG. 5B illustrates removal of an old ink delivery system from an inkjet cartridge.

FIG. 5C illustrates the insertion of a new ink delivery system into an inkjet cartridge.

DETAILED DESCRIPTION OF THE PREFERRED EMBODIMENT

Figure 1A:
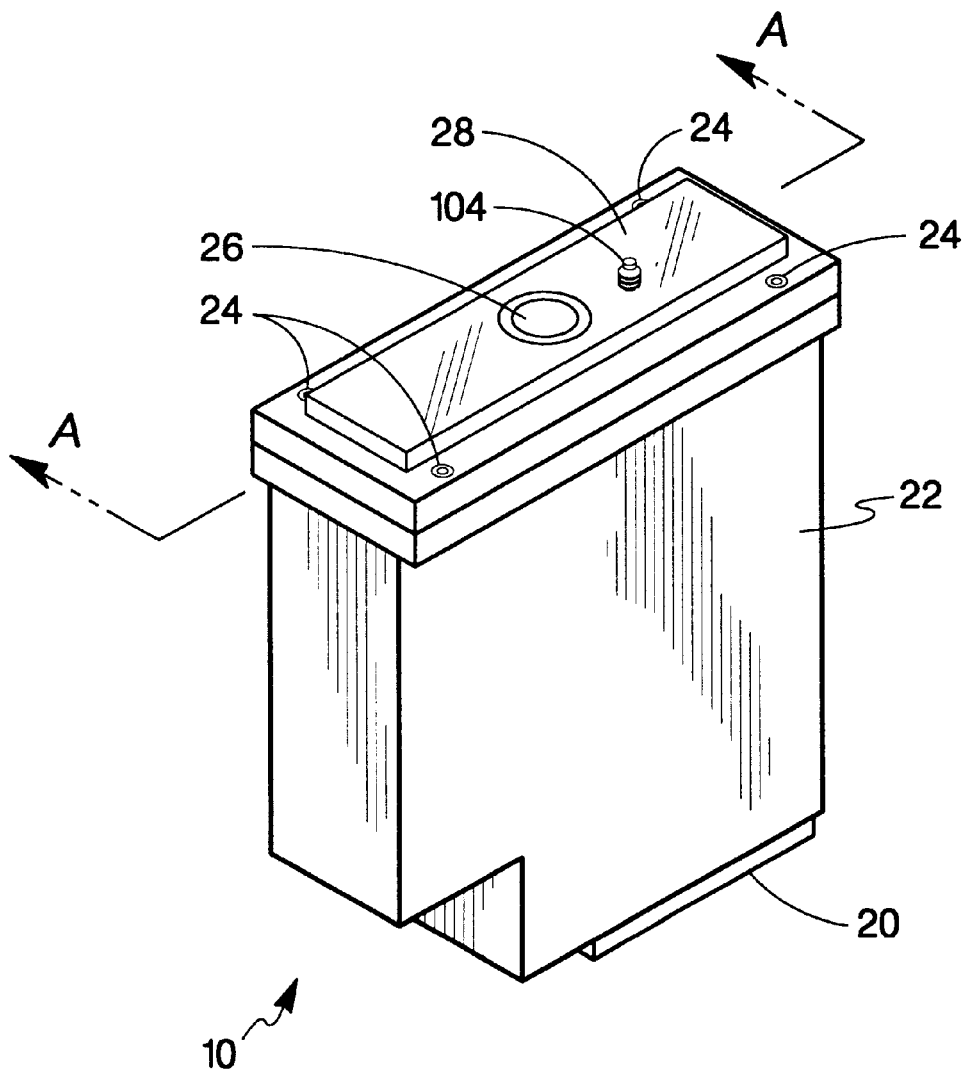
FIG. 1A is an isometric drawing showing an exemplary inkjet cartridge using heat stake attachment of members.

FIG. 1 schematically depicts an exemplary embodiment of a printing system 16 for which the present invention can be employed. Printing system 16 includes an inkjet cartridge 10 that is fluidically connected to an ink supply 70 via conduit 68. Inkjet cartridge 10 includes a printhead 20 that receives signals from printing system control electronics 30 and selectively deposits ink onto media (not shown) in response.

In this exemplary embodiment, print cartridge 10 is an assembly including a receptacle 22 and a cover 28 which comprise printhead housing 36. Receptacle 22 has an inner cavity 32 that is fluidically connected to printhead 20. Inner cavity 32 forms an opening 18. Cover 28 is positioned in opening 18. Cover 28 includes an ink inlet 104 that is fluidically coupled to conduit 68. Cover 28 also includes a valve 72 that fluidically couples ink inlet 104 to inner cavity 32.

The combination of ink supply 70, conduit 68, and cover 28 can be referred to as an ink delivery system (IDS) for printhead 20. When valve 72 is open, ink flows from ink supply 70, through conduit 68, to valve 72, and into inner cavity 32. During operation of printhead 20, a pressure regulator actuator 48 opens and closes valve 72 in response to pressure changes in inner cavity 32 to regulate the pressure of ink supplied to printhead 20. It is important that the pressure in inner cavity 32 be maintained within a printhead operating range (typically a negative 0.5 to 9.0 inches of water) to assure a stable negative operating pressure in inner cavity 32.

If cover 28 has a pressure regulator actuator attached to it, it is difficult to use ultrasonic welding between cover 28 and receptacle 22. This difficulty is caused by the difficulty in directing the ultrasonic energy only to the sealing surface and not to the regulator portions. If the regulator parts are damaged during ultrasonic welding, the damage is difficult to detect. Thus, parts may be only slightly damaged yet still function when the unit is tested. The damaged parts may prevent optimum performance or fail later causing consumer displeasure and warranty replacements. An additional concern with using ultrasonics is that the cover 28 and receptacle 22 must both be made of a material that is compatible with each other to form an ultrasonic seal.

When a conventional adhesive is used for sealing the cover 28 and receptacle 22, the amount of time needed to cure the adhesive prevents the process from being practical for mass production. Heating the adhesive during curing can shorten the process time needed to cure the adhesive. The heat, if not carefully controlled, can melt, deform or damage portions of the regulator mechanism. An additional concern with an adhesive is that the cover 28 and receptacle 22 must both be made of a material that is compatible with the adhesive used. Often times, the design criteria for the cover 28 and receptacle 22 will require that they be made of different materials, thus limiting the type of adhesive, indeed if any acceptable choices of adhesive are available that also are compatible with the ink stored in the container.

One aspect of the present invention concerns a means of sealing an ink containment vessel such as inkjet cartridge 10. In the preferred embodiment, the sealing means is a compressed gasket 120 that is located between cover 28 and receptacle 22. This sealing means can be accomplished without costly adhesive curing processes or ultrasonic welding processes that may damage the materials used to fabricate inkjet cartridge 10.

Another aspect of the invention concerns a means of changing the ink delivery system to accommodate different printing requirements. In the preferred embodiment, gasket 120 provides an advantageous way of changing the ink delivery system without damage to receptacle 22. This can be done by disabling the ink delivery system and then connecting a new ink delivery system to printhead 20. In the preferred embodiment, this is done by removing cover 28 from receptacle 22 and then connecting a new ink delivery system to inner cavity 32. Before discussing this second aspect of the invention, it is useful to discuss the first aspect with respect to FIGS. 1A–4D.

FIG. 1A depicts an isometric view of an ink containment vessel such as inkjet cartridge 10 that includes only details pertaining to the assembly of inkjet cartridge 10. A cover such as cover 28 is secured to a receptacle such as receptacle 22 via attachment features 24. In the preferred embodiment, attachment features 24 comprise snap features, however, other embodiments might use heat stake pins as in FIGS. 1A and 1B, or screws, staples, or clips which are discussed later.

FIG. 1A shows the outside of an inkjet cartridge 10. Cover 28 and receptacle 22 (either piece comprised of polyphenylene sulfide, liquid crystal polymer, syndiotactic polystyrene or polyethylene napthalate, but preferably polyphenylene sulfide material in the preferred embodiment) are attached using attachment features 24. Ink inlet 104 is used to connect the inkjet cartridge 10 with the rest of the printing system 16. The ink is expelled from ink cartridge 10 through printhead 20. As ink is expelled, air enters screw air vent 26 to operate the pressure regulator actuator 48.

Figure 1B:
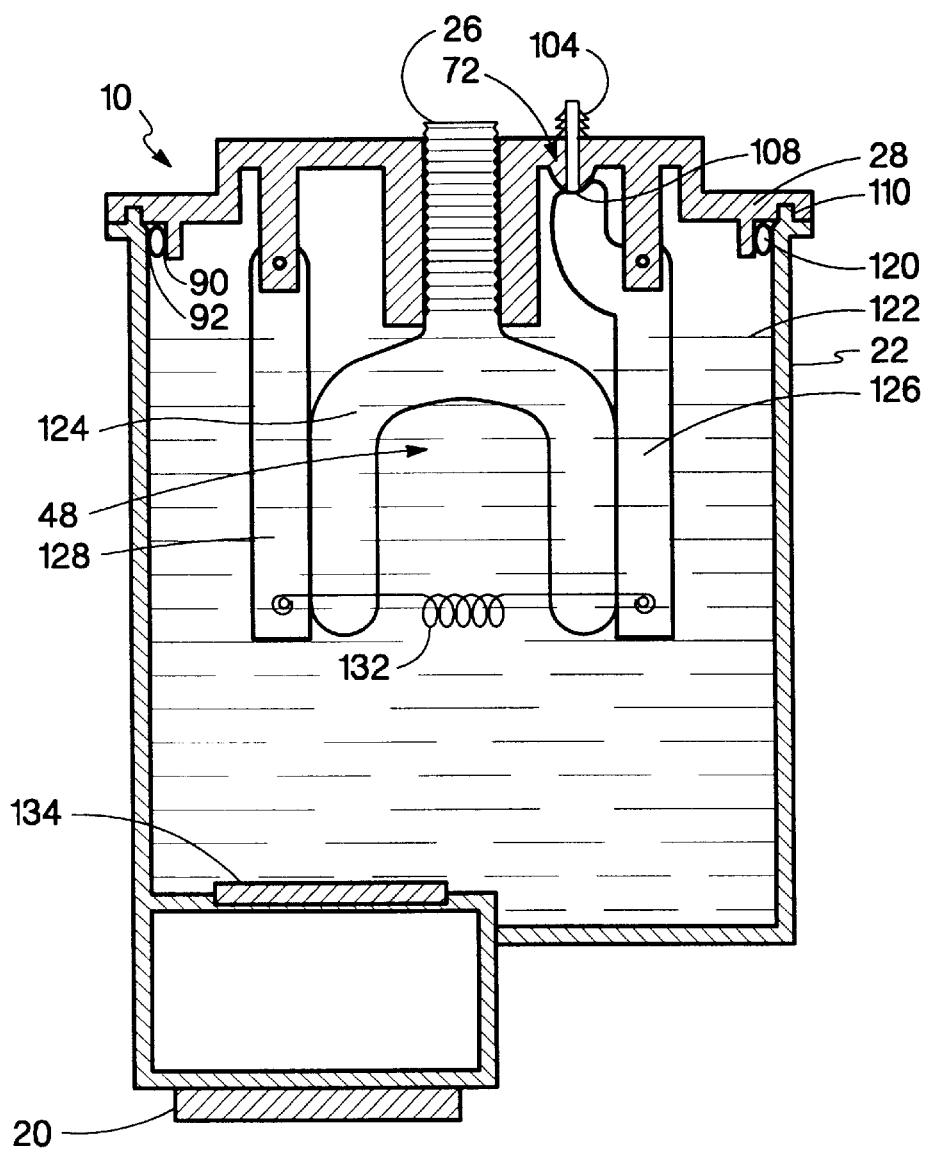
FIG. 1B is a schematic cross-sectional drawing illustrating an exemplary inkjet cartridge employing the preferred embodiment of the invention along the AA view of FIG. 1A.

FIG. 1B is a cross-sectional schematic representation of the exemplary inkjet cartridge 10 of FIG. 1A along the AA perspective that utilizes the preferred embodiment. The cover 28 is sealed to receptacle 22 using a gasket 120. Gasket 120 is compressed in a direction normal to the direction in which cover 28 is assembled to receptacle 22. Support member 110 prevents the sidewall deflection of receptacle 22 ensuring that gasket 120 is not under-compressed, which would compromise the fluid seal between the cover 28 and receptacle 22. Maintaining a proper seal is critical to the stable operation of inkjet cartridge 10.

As described with respect to FIG. 1, inkjet cartridge 10 includes a means of maintaining a stable operating pressure in inner cavity 32. Valve 72 is formed by a seal between a lever 126 and a valve outlet portion 108. Lever 126 is pivotally mounted to cover 28 such that the rotational motion of lever 126 opens and closes valve outlet portion 108. An expandable bag 124 is located adjacent to lever 126. Expandable bag 124 has an inner surface that is fluidically connected to outside atmosphere through screw air vent 26. As the printhead 20 ejects ink droplets, the pressure in inner cavity 32 become more negative. In response, expandable bag 124 expands, pressing on lever 126 to allow ink to flow into inner cavity 32 as discussed with respect to FIG. 1.

The inkjet cartridge 10 when assembled holds an ink supply 122. Ink supply 122 is refilled by the use of an fluid regulator type ink delivery system (IDS), for pressure regulator actuator 48, comprised of expandable bag 124, moment arm 128, valve moment arm 126, spring 132 and screw air vent 26. When ink supply 122 is reduced, expandable bag 124 expands causing valve moment arm 126 to rotate causing valve seat 108 to open which allows ink in from an ink inlet 104. Ink is drawn out of the inkjet cartridge through ink filter 134 and out of printhead 20 when printing onto an external surface.

In the preferred embodiment, the inkjet cartridge 10 is assembled by mounting the gasket 120 so that it circumscribes a gasket receiving area 90 of cover 28. To make assembly of cover 28 into receptacle 22 easier, the gasket 120 can be pre-coated with polyethylene glycol (PEG). Alternatively, the seal area of the receptacle 22 can be pre-coated with PEG. An alternative approach is to use a gasket that is molded with a lubricant (such as PEG, or Teflon, preferably Teflon) to reduce the amount of process steps in manufacturing and to provide consistent results. After gasket 120 is mounted on cover 28, cover 28 is inserted into receptacle 22. During insertion, gasket 120 is compressed by features of cover 28 and receptacle 22. At the completion of insertion, gasket 120 is compressed in a direction that is normal (orthogonal) to the direction of insertion. This form of compression causes gasket 120 to form a seal between cover 28 and receptacle 22 whereby the compressive force from gasket 120 is directed to the sidewalls of receptacle 22 and cover 28. Further, this form of compression prevents compression forces from acting in a direction that would separate cover 28 and receptacle 22, thereby minimizing stress on attachment features 24.

Gasket 120 can be fabricated by two different methods to provide an effective seal. A uniform cross-sectional gasket is the easiest to fabricate, however, the design of the molded cover 28 and receptacle 22 must accommodate the gasket shape. Often times, for other design decisions, the use of a uniform cross-sectional gasket is not desired. In these cases, a non-uniform cross-sectional gasket can be made to precisely mate with existing molded parts of cover 28 and receptacle 22.

Figure 2A:
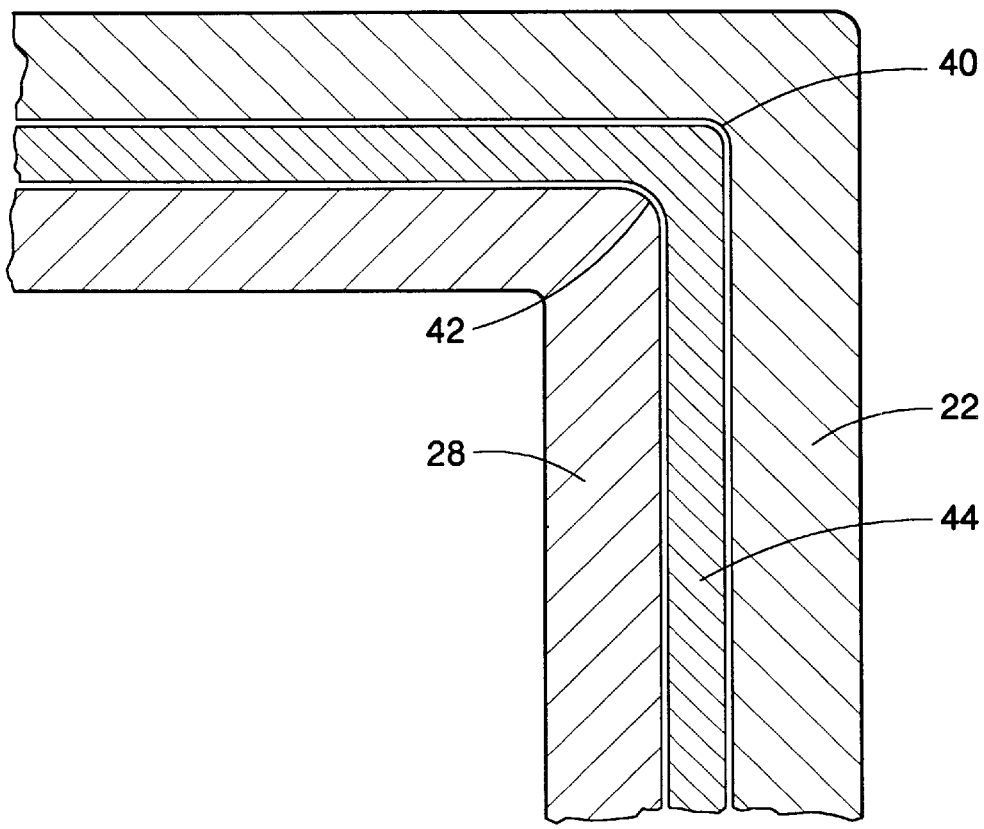
FIG. 2A is a drawing illustrating a non-uniform cross-sectional gasket such as that used in FIG. 1B, between two members of the cartridge where the gasket is specially molded to conform to the member parts.

FIG. 2A shows the detail of how a non-uniform gasket 44 is made to conform to the dimensions of cover 28 and receptacle 22. Non-uniform gasket 44 has for each corner an inner radius 42, which is shaped to fit the curvature of cover 28. The corner also has an outer radius 40, which is shaped to fit the curvature of receptacle 22. By using non-uniform gasket 44, the seal formed by compression of the gasket can be performed with parts that have a preexisting or required physical design.

Figure 2B:
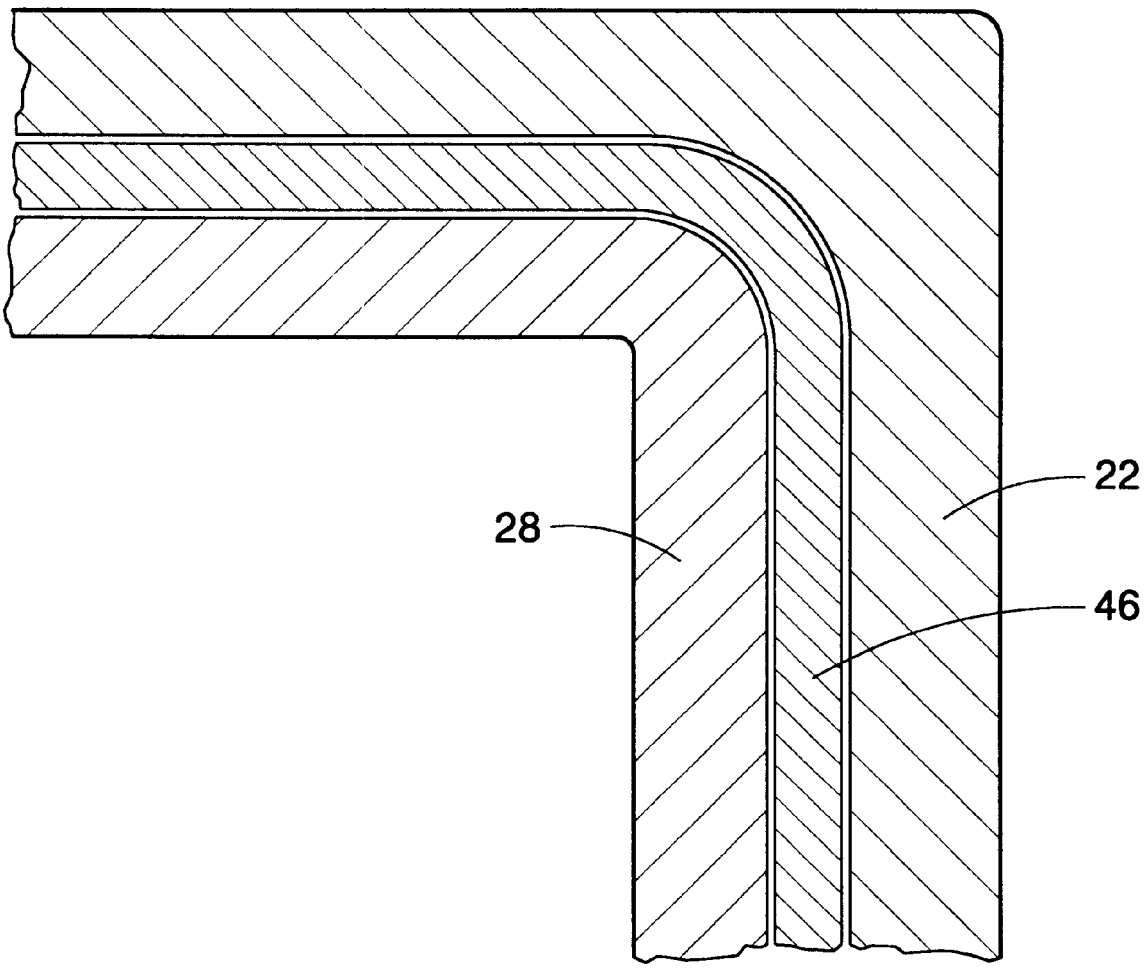
FIG. 2B is a drawing illustrating a uniform cross-section gasket such as that used in FIG. 1B, between two members of the cartridge in which the members are molded to conform to the uniform gasket.

Alternatively, FIG. 2B shows the detail of uniform gasket 46, which is molded such that it has a consistent uniform cross-sectional profile. The advantage of this approach is a simpler tool design for the molding of uniform gasket 46. This approach is possible if cover 28 and receptacle 22 can be molded to accept uniform gasket 46.

Gasket 120, representing either uniform gasket 46 or non-uniform gasket 44, has compressive forces that do not interact with the attachment of cover 28 to receptacle 22, and several alternative methods for this attachment exist. In order to prevent excessive compression or non-compression during periods of unforeseen stress (i.e. dropping, squeezing, etc.) the cover 28 has molded into it a flange support member 110 to limit deflection of the sidewalls of receptacle 22. The attachment method and support member 110 can be accomplished several ways of which FIGS. 3A through 3D show representative samples. Those skilled in the art will appreciate that different methods of attachment for the cover 28 and receptacle 22 could be used and still meet the spirit and scope of the invention.

Figure 3A:
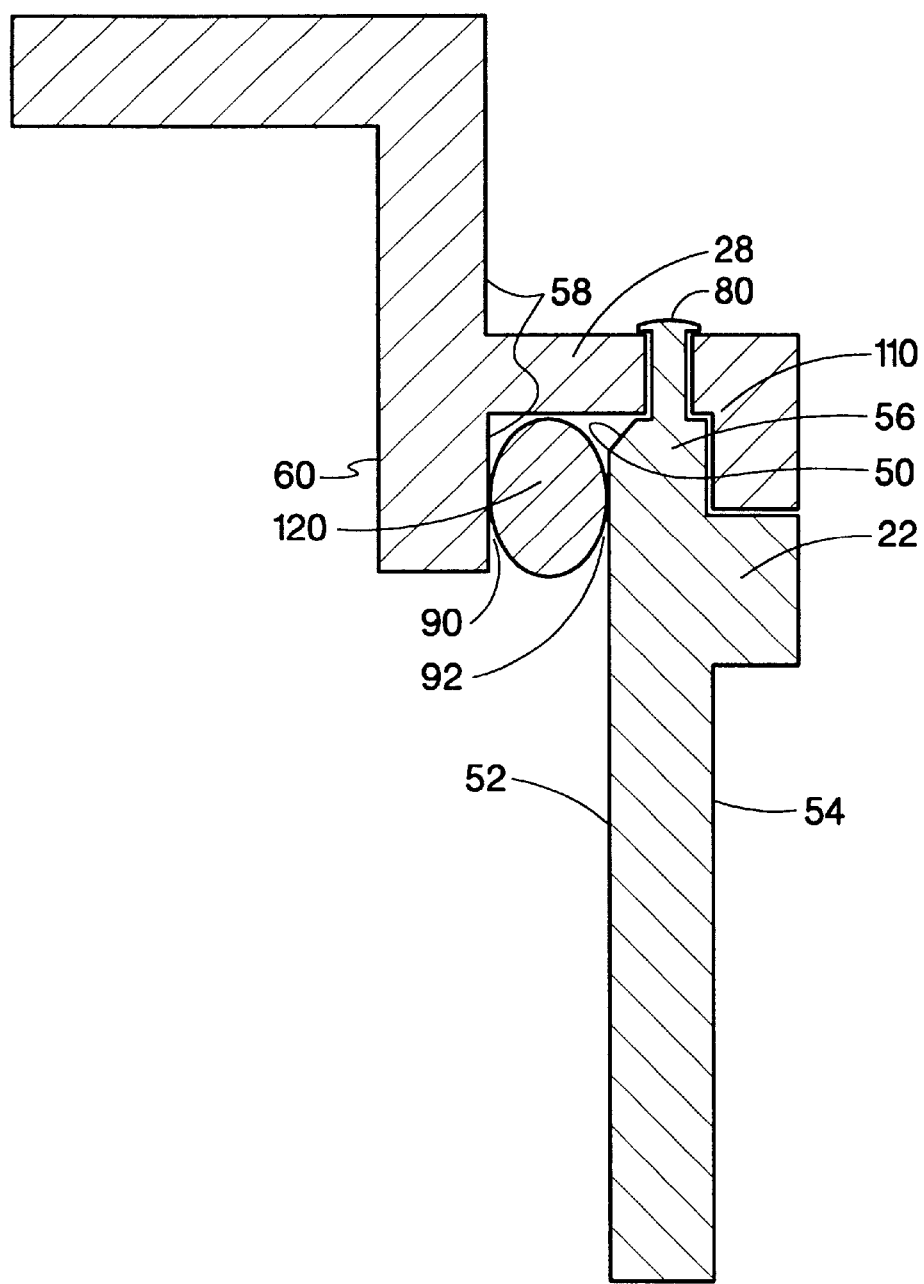
FIG. 3A is a drawing illustrating the assembly of the two members of the cartridge of FIG. 1B with a gasket and a heat staking method of attaching the two members.

FIG. 3A shows an embodiment in which the receptacle 22, having an inside surface 52, an outside surface 54, a peripheral lip 56 with heat stake posts 80 that are formed to hold cover 28 in place. Cover 28 has an inside surface 60 and an outside surface 58. The heat applied to heat stake posts 80 is localized and very temporary, thus preventing the heat related problems that occur with a heat curing adhesive. Also shown is a beveled edge 50 on receptacle 22 that helps to slowly compress gasket 120 as cover 28 is inserted into receptacle 22. Gasket 120 contacts gasket receiving area 90 on cover 28 and gasket seal area 92 on receptacle 22. Gasket receiving area 90 and gasket seal area 92 are molded to have essentially zero degrees of draft. This lack of inclination keeps the compressive forces applied directly inward to the gasket 120 and limits the forces applied to the gasket that are not directed inward to the gasket 120 to prevent its movement after the inkjet cartridge 10 is assembled. The support member 110, in this exemplary embodiment, is formed as a flange around the outside surface 58 of cover 28.

Figure 3B:
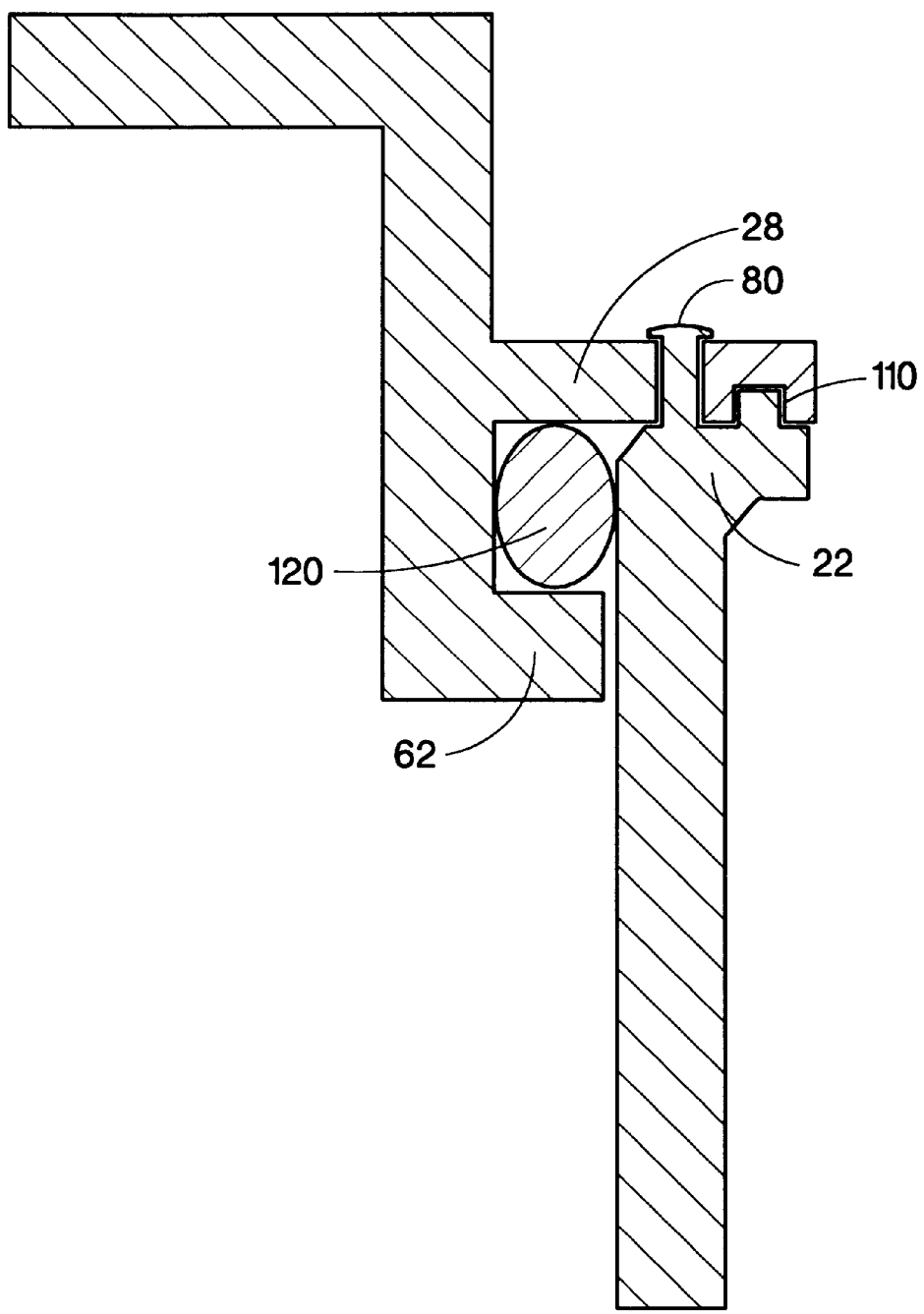
FIG. 3B is a drawing illustrating the assembly of the two members of the cartridge of FIG. 1B with a gasket and a heatstaking method of attaching the two members with an alternative design for limiting sidewall deflection.

FIG. 3B shows an alternative embodiment for a heat stake attachment scheme in which an additional support member 62 is formed in cover 28 such that it also supports holding gasket 120 to prevent gasket 120 from becoming dislodged during the manufacturing process. Support member 110 prevents outward flexing of the sidewalls of receptacle 22. Heat stake post 80 is molded into receptacle 22.

Figure 3C:
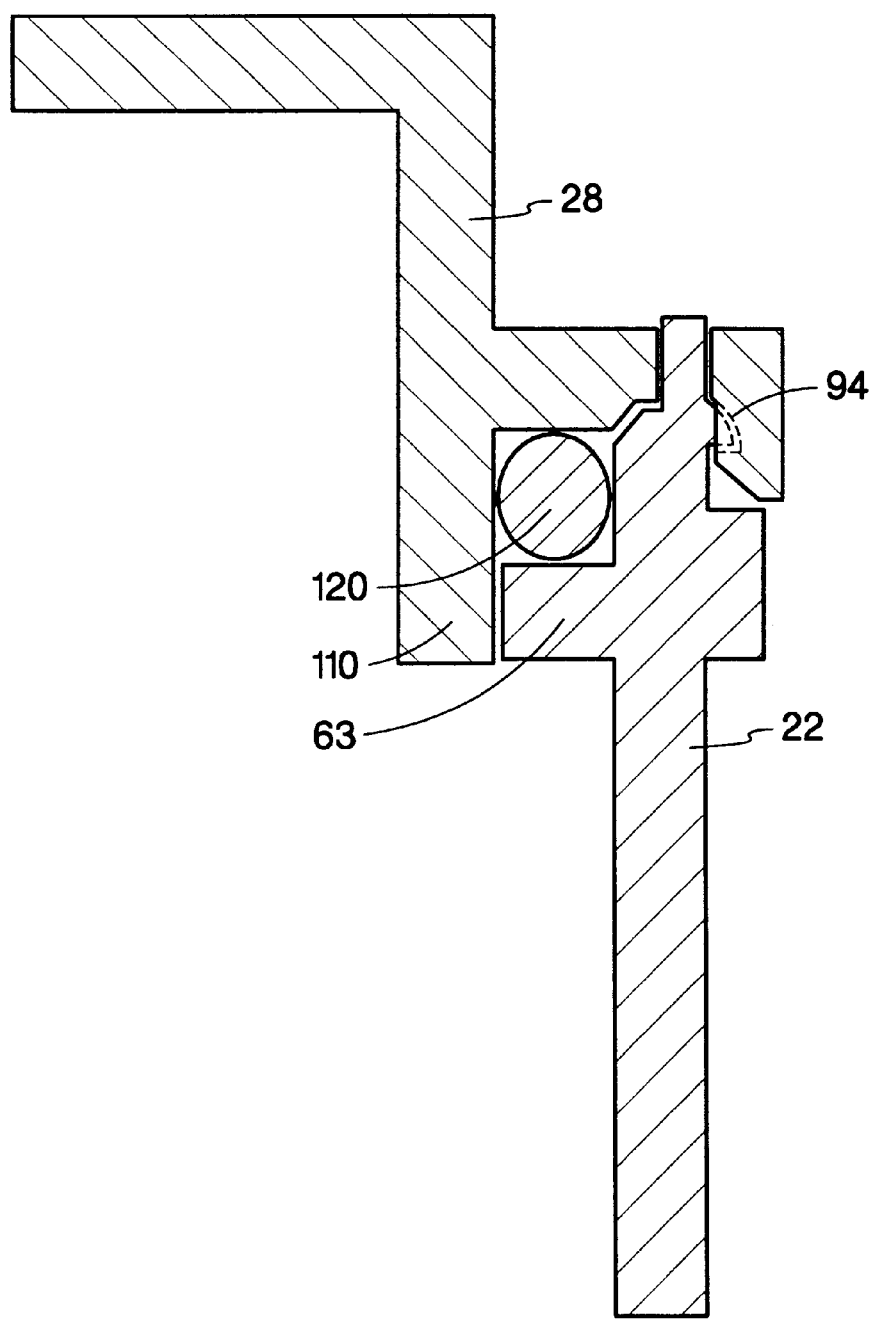
FIG. 3C is a drawing illustrating the assembly of the two members of FIG. 1B with a gasket and the preferred attachment scheme using a snap lock mechanism method of attaching the two members.

FIG. 3C shows the preferred embodiment using a snap lock mechanism 94 for attachment. Further detail of the snap lock is shown in FIGS. 4A–4C. Receptacle 22 is molded to provide a barrier to gasket 120 and to provide a stop 63 for support member 110 that is molded into cover 28.

Figure 3D:
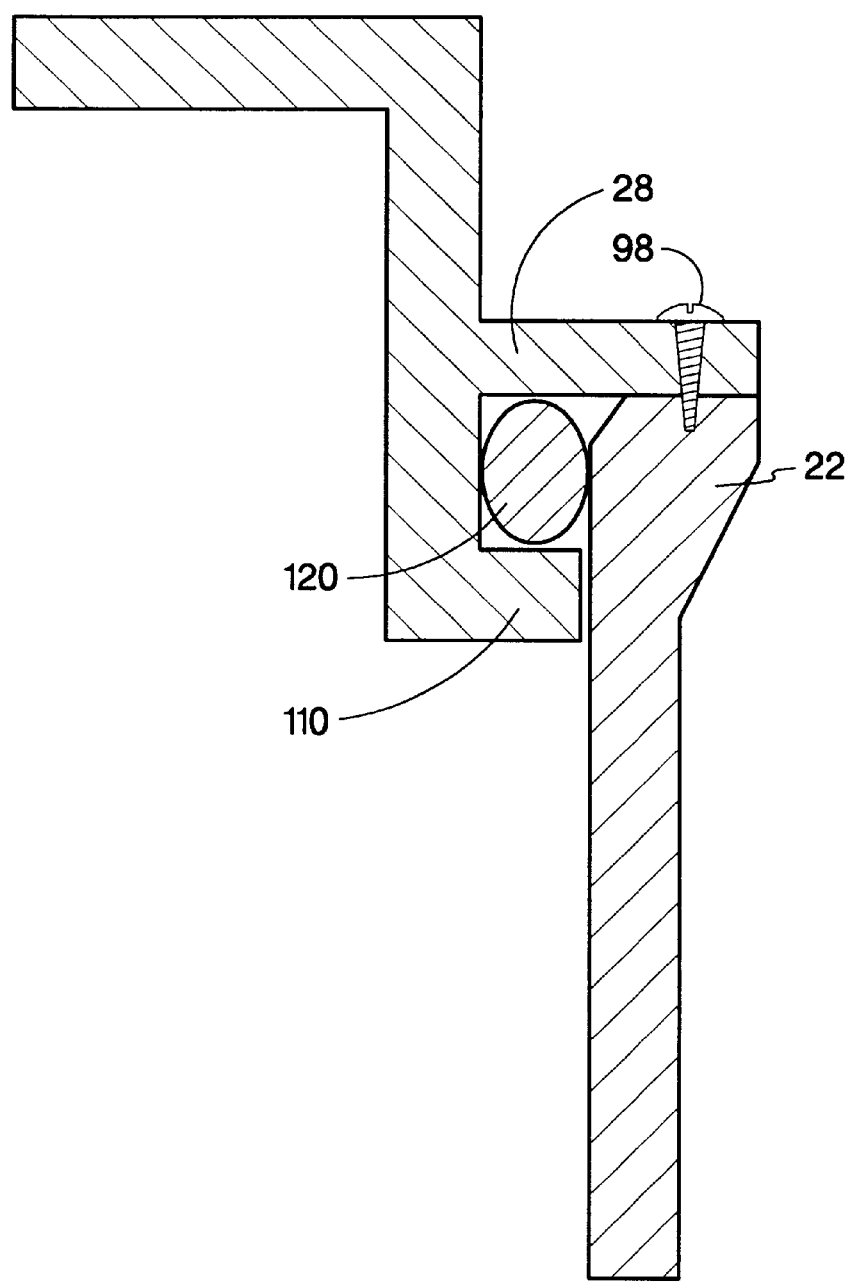
FIG. 3D is a drawing illustrating the assembly of the two members of FIG. 1B with a gasket and an alternative attachment scheme using a screw method of attaching the two members.

FIG. 3D shows an alternative embodiment in which a screw 98 is used to attach cover 28 to receptacle 22. Support member 110 is used to limit sidewall deflection of receptacle 22 thus maintaining a seal with gasket 120 when external forces are applied to the inkjet cartridge 10.

FIG. 4A shows the receiving portion of the snap lock mechanism 94 used in FIG. 3C. The receiver area 88 is molded into first member 28. An incline 87 is used to slowly glide the snaps (86 on FIG. 4B) until the snaps 86 rest on shelf 89. FIG. 4B shows the snap portion of the snap lock mechanism 94 with snaps 86 molded into second member 22. FIG. 4C shows the receiver area 88 and snap 86 when they are mated.

Figure 4D:
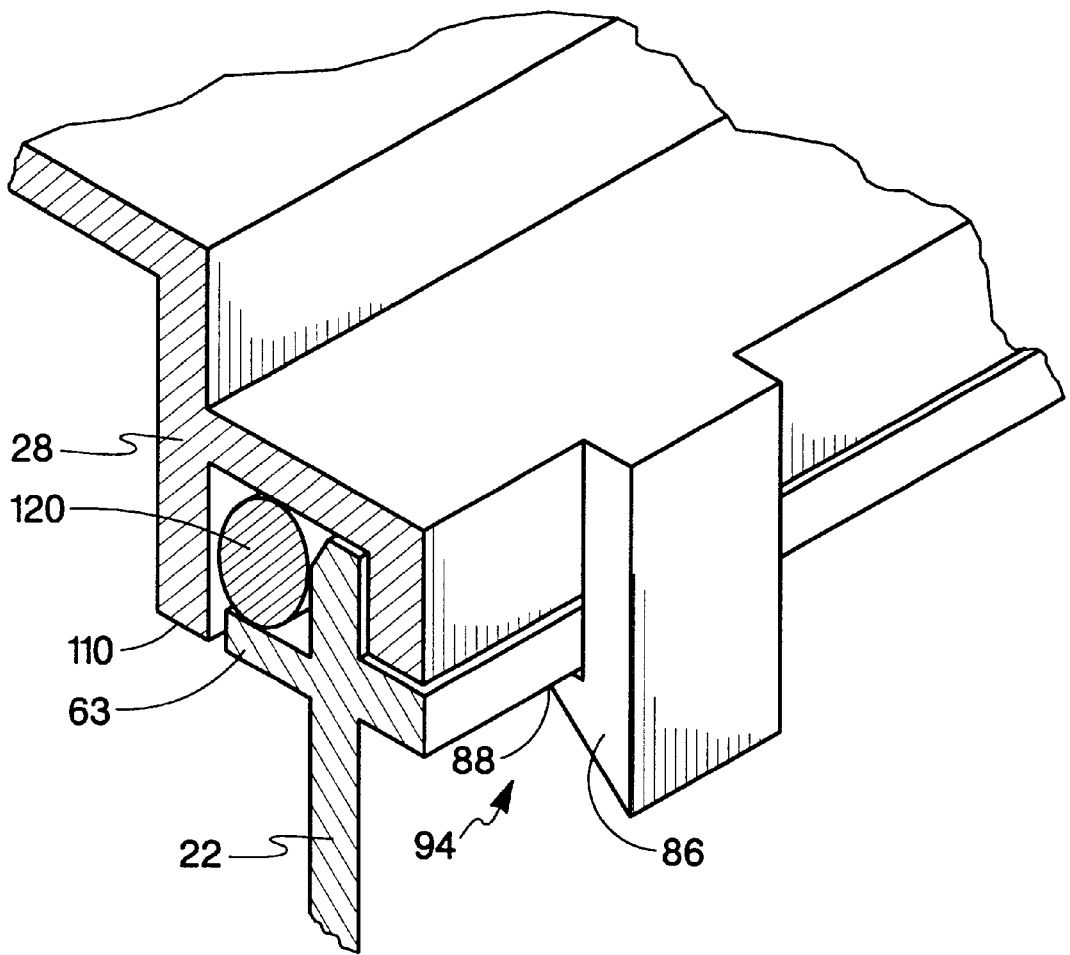
FIG. 4D illustrates an alternative snap lock mechanism.

FIG. 4D illustrates an alternate snap lock mechanism 94 where a snap 86 is molded as part of cover 28. This snap 86 mates into a receiver area 88 of receptacle 22, securing cover 28 to receptacle 22. Two or more snap lock mechanisms 94 are molded into cover 28 as required. Those skilled in the art will appreciate that other snap feature shapes are possible which could latch on the inside of receptacle 22 or the outside of receptacle 22 as illustrated and still meet the spirit and scope of the invention.

In regard to FIGS. 5A-5D, a method for modifying the ink delivery system of printing system 16 (FIG. 1) is described. This enables printing system 16 to accommodate a variety of spatial configurations and ink use rate requirements. The ink delivery system is replaced by disabling the first ink delivery system and connecting a second ink delivery system to printhead housing 36.

Figure 5A:
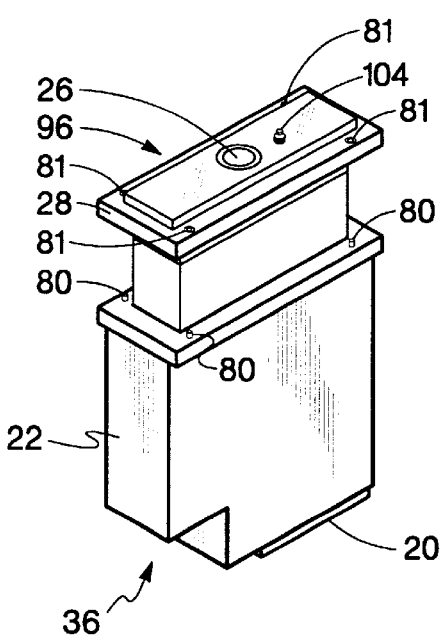
FIG. 5A–5C schematically illustrate a process of dis-abling an existing ink delivery system and for providing a new ink delivery system.
Figure 5C:
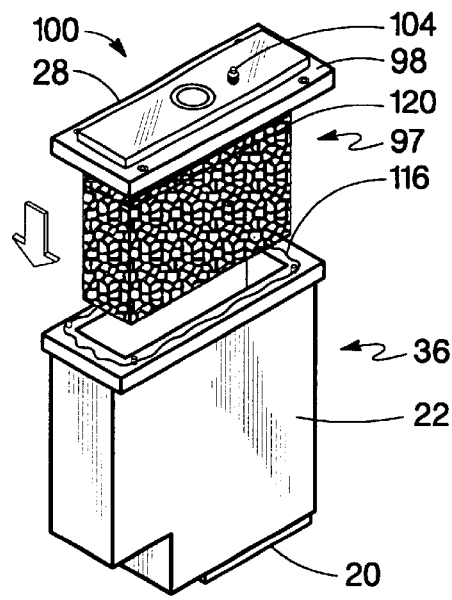
Figure 5B:
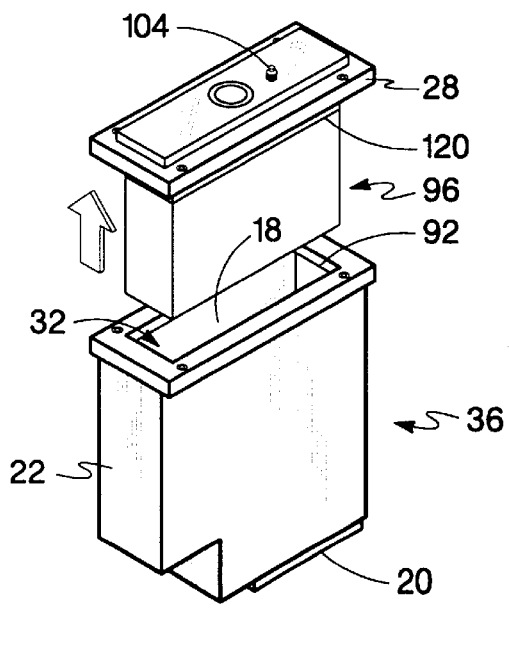

In the preferred embodiment, a first ink delivery system is disabled by unsealing and removing cover 28 from receptacle 22 as depicted by FIGS. 5A and 5B. Specifically, FIGS. 5A–5D illustrate a method to remove and replace an ink-delivery subassembly (IDS), such as the regulator type shown in FIG. 1B and represented in FIGS. 5A and 5B as a box and described as old IDS 96. Therefore, if an IDS is defective, the print cartridge can be repaired. In addition, new designs, which have new features or benefits, can replace the existing IDS. Having this flexibility allows the inkjet cartridge 10 to be manufactured for high volumes, and at the same time, accommodate the printhead 20 in receptacle 22 for use in lower volume applications.

As indicated by FIG. 5A, the attachment features 24 (FIG. 1A) are first disabled. In the case wherein the attachment features are heat stake posts 80 as depicted by FIG. 3B, the heat stake posts 80 may be sheared or otherwise broken. Next, cover 28 is removed in a direction that is substantially perpendicular to a plane defined by gasket 120. In FIG. 5B, this cover motion is used to remove the old IDS 96, further comprising cover 28, gasket 120, and ink inlet 104, from the printhead housing 36, which further comprises a gasket seal area 92, printhead 20 and receptacle 22, which has an inner cavity 32 with opening 18. As this motion is done, the seal formed by gasket 120 with respect to receptacle 22 and cover 28 is broken.

Next in FIG. 5C, a new IDS, or a portion 97 of it, of a similar or different type than old IDS 96, discussed in FIGS. 1 and 1B, is oriented such that it can be positioned into the printhead housing 36 through opening 18. In the preferred embodiment, the same gasket arrangement is used to provide the seal as was discussed with respect to FIGS. 1B and 2A–2B. However, provided it can be tolerated by the new ink delivery system, alternative sealing arrangements could be used such as adhesives and ultrasonic welding. In this preferred embodiment, the new IDS portion 97 is preferably moved into position in a direction substantially perpendicular to a plane defined by the gasket sealing surfaces, as depicted by FIG. 5C. New IDS portion 97 has a gasket 120 thereon that is similar to the gasket structure discussed with respect to FIGS. 1B and 2A–2B. When the new IDS portion 97 is properly positioned in inner cavity 32, as indicated by FIG. SD, gasket 120 forms a compression seal between portion 97 and receptacle 22. After positioning the new IDS portion 97, an additional means of attachment may be used to secure new IDS portion 97 to receptacle 22, such as the attachment features indicated in FIG. 1A, or snaps, adhesives, rivets, crimp rings, screws, or other suitable means.

After attaching a new IDS portion 97, a flow of ink can be established between an ink supply 70 (see FIG. 1) and printhead 20. The new IDS portion 97, the ink supply 70, and any conduit 68 in-between, forms a new ink delivery system (IDS). During a printing operation, the new IDS 100 provides pressure regulation in inner cavity 32 that enables stable operation of printhead 20.

Although a particular way of disabling the old IDS 96 and connecting the new IDS 100 was shown, other options are possible. For example, the old IDS 96 is disabled to not provide ink to the ink delivery system, such as by cutting off the flow of ink between the old ink supply 70 and inner cavity 32. Next, an orifice 84 is formed in the side of receptacle 22 with a process such as drilling and tapping. Next, a new IDS 100 is fluidically coupled to the orifice. However, the gasket method described above is advantageous because it does not require machining or damaging receptacle 22.

Figure 5D:
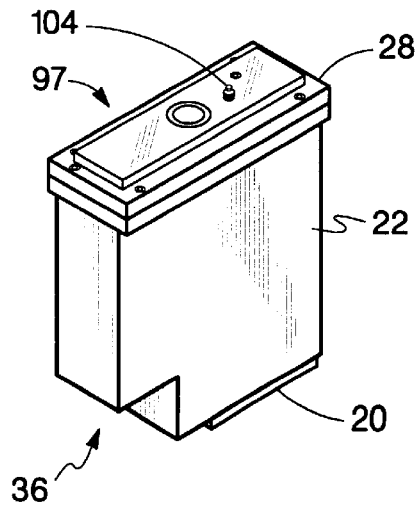
FIG. 5D illustrates the re-attachment of a new ink delivery system to an inkjet cartridge.
Figure 6A:
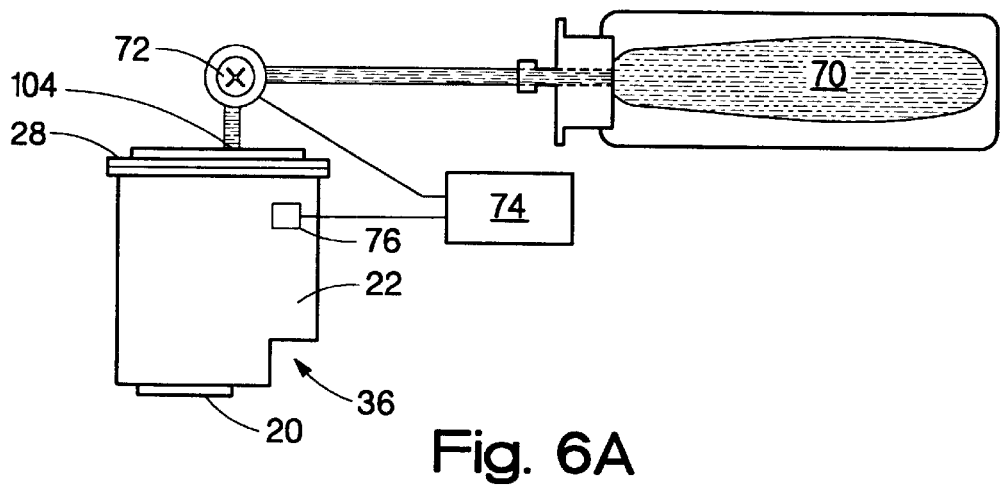
FIG. 6A illustrates an electronically controlled valve ink delivery system connected to an inkjet cartridge.
Figure 6B:
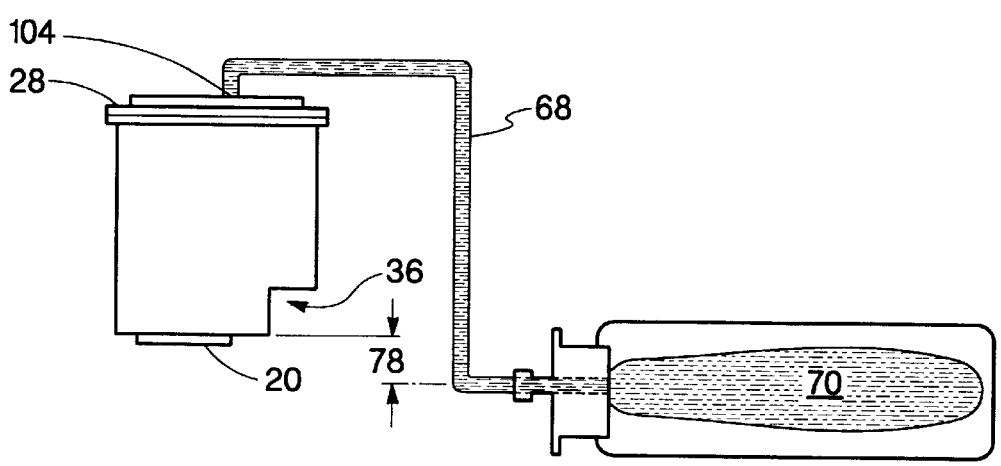
FIG. 6B illustrates a gravity regulated ink delivery system connected to an inkjet cartridge.
Figure 6C:
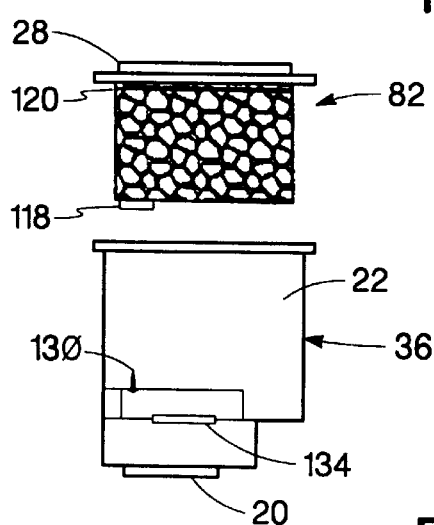
FIG. 6C illustrates a removable type ink delivery system using the gasket sealing mechanism of the preferred embodiment.

In FIGS. 5C and 5D, the new IDS portion 97 was generically shown, without reference to a specific form of ink delivery system. This is because portion 97 can be part of any number of IDS configurations as indicated by FIGS. 6A–6C.

Usually, the same gasket seal area 92 (FIG. 5B) on the inner perimeter of the inner cavity 32, where the gasket was seated for the original seal, is used to form the new seal. However, one new sealing method might be to use an adhesive 116, since in a low volume—no heat process, the previously stated limitations of using an adhesive can be avoided. Similarly, if the new IDS portion 97 replacement can tolerate it, the new IDS portion 97 and printhead housing 36 can be sealed using ultrasonic welding. Generally, the new IDS portion 97 will provide the ultrasonic welding features to facilitate the welding process.

When the gasket 120 is engaged between the new IDS portion 97 and printhead housing 36, as illustrated in FIG. 5D and attached using adhesive 116, the same gasket or an identical replacement may be used to create a new seal. However, a totally new type of gasket 120 or other type of sealant could be used between the new IDS portion 97 and printhead housing 36, such as an adhesive 116, another resilient member, or other sealant known to those skilled in the art and still meet the spirit and scope of the invention.

Finally, the assembled inkjet cartridge 10 should be primed with ink and any remaining air inside the printhead module purged. Several methods of performing such steps are known to those skilled in the art.

Several methods of providing pressure regulation of the ink in an IDS are available. A common type is to use capillary action such as that using foam, for example Erturk et al., "Ink Retention in a Color Thermal Inkjet Pen", Hewlett-Packard Journal, August 1988, pp.41–45. Another method is active regulation in which a pressure valve opens and closes in response to a pressure change in the printhead housing; see Cowger, "The Optimization of Deliverable Ink from a Disposable Print Cartridge", IS&T's Eighth International Congress on Advances in Non-Impact Printing Technologies", 1992, pp.312–317. A simple method is to just provide passive regulation where the height of the ink source relative to the printhead level regulates the pressure. Those skilled in the art will realize that other pressure regulating systems exist and still fall within the spirit and scope of the invention.

Several embodiments of ink delivery systems (IDS), which can use gasket 120 and printhead housing 36, are now described that demonstrate the usefulness of the invention.

FIG. 6A illustrates a first embodiment of an IDS that utilizes electronically controlled pressure regulation and which includes an ink supply 70, a electronically actuated valve 72, a pressure sensor 76, and printing system control electronics 74. Pressure sensor 76 provides signals to printing system control electronics 74 indicative of pressure changes in printhead housing 36. Printing system control electronics 74 opens and closes valve 72 in response to regulate fluid pressure in printhead housing 36.

FIG. 6B illustrates a second embodiment of an IDS which includes an ink supply 70, a conduit 68, and a cover 28 used to couple the conduit 68 entering ink inlet 104 to the interior of the printhead housing 36. In this second embodiment, a gravity regulated IDS, the pressure within printhead housing 36 is regulated via the height difference 78 between the printhead 20 and the ink supply 70 center of mass.

FIG. 6C illustrates a third embodiment of an IDS, referred to as a removable IDS 82, such as illustrated in commonly assigned U.S. Pat. Nos. 5,642,144 and 5,680,164. In this embodiment, the IDS includes a resilient sealing device, such as the gasket 120, to provide a perimeter seal between the removable IDS 82 and the printhead housing 36. The removable IDS 82 contains a reservoir to hold the ink and a regulator mechanism such as foam, or spring bags, but other known regulator mechanisms could be used and still meet the spirit and scope of the invention. A needle 130 mounted in printhead housing 36 punctures though a septum 118 in the removable IDS 82 to allow the ink within removable IDS 82 to flow to the printhead 20 through ink filter 134.

What is claimed is:

1. An inkjet storage container sealing mechanism comprising:
    a receptacle having an inside surface, an outside surface and a peripheral lip surrounding an opening in said receptacle, a gasket seal area inside said opening; and a beveled edge surrounding said opening and formed into said receptacle and extending to said gasket seal area;
    a cover having an inside surface, an outside surface, and a flange member disposed on said cover outside surface, said cover adapted to fit said opening with said cover outside surface facing said receptacle inside surface, and said flange member adapted to mate with said peripheral lip; and
    a gasket surrounding said opening and disposed between said receptacle inside surface and said cover outside surface whereby a direction of compression of said gasket is normal to said receptacle inside surface and normal to said cover outside surface and the direction of compression is normal to the direction of insertion of said cover into the opening in said receptacle whereby the normal compression of said gasket is done gradually during an insertion of said cover into said opening of said receptacle.

2. The inkjet storage container sealing mechanism of claim 1 wherein said cover and said receptacle are joined using heat staking.

3. The inkjet storage container sealing mechanism of claim 1 wherein said cover and said receptacle are joined using a snap lock mechanism between said cover and said receptacle.

4. The inkjet storage container sealing mechanism of claim 1 wherein said cover and said receptacle are attached using at least one screw to join said cover to said receptacle.

5. The inkjet storage container mechanism of claim 1 wherein said gasket further comprises a plurality of individual comers, each individual comer having an inner radius and an outer radius, said inner radius formed to outline said outside surface of said cover, said outer radius shaped to conform to said inside surface of said receptacle.

6. The inkjet storage container sealing mechanism of claim 1 wherein said gasket is constructed having a uniform diameter.

7. The inkjet storage container sealing mechanism of claim 1 wherein said cover further comprises an ink inlet, through which ink is introduced into the inkjet storage container.

8. The inkjet storage container of claim 1 wherein said gasket seal area has essentially zero degrees of draft.

9. An inkjet storage container comprising:
    a cover including;
        at least two snap lock mechanisms, and
        a gasket receiving area;
    a receptacle including;
        a plurality of sidewalls,
        at least two sidewall protrusions disposed on said plurality of sidewalls, said at least two snap lock mechanisms interlockable into said at least two sidewall protrusions,
        an opening defined by said plurality of sidewalls,
        a gasket seal area inside said opening, and
        a beveled edge surrounding said opening and formed into said receptacle and extending to said gasket seal area;
    a gasket disposed on said cover such that said gasket receiving area of said cover is circumscribed by said gasket, and said gasket inscribed within said gasket seal area of said receptacle, said gasket compressed between said cover and said opening of said receptacle in a direction normal to said receptacle gasket seal area and said gasket receiving area, whereby the compression of said gasket is done gradually during insertion of said cover subassembly into said opening of said receptacle and the direction of compression is normal to the direction of insertion of said cover into the opening in said receptacle; and
    a support structure on said cover circumscribing said plurality of sidewalls of said receptacle after assembly whereby said seal is maintained.

10. The inkjet storage container of claim 9 wherein said gasket receiving area has essentially zero degrees of draft and wherein said gasket seal area has essentially zero degrees of draft.

* * * * *

UNITED STATES PATENT AND TRADEMARK OFFICE
CERTIFICATE OF CORRECTION

PATENT NO.    : 6,183,072 B1
DATED         : February 6, 2001
INVENTOR(S)   : John M. Altendorf It is certified that error appears in the above-identified patent and that said Letters Patent is hereby corrected as shown below:

Title page,
Item [54], delete "SEAL USING GASKET COMPRESSED NORMAL TO ASSEMBLY AXIS OF TWO PARTS", and insert therefore -- INKJET STORAGE CONTAINER SEALING MECHANISM --.

Column 10,
Line 15, delete "comers" and insert therefore -- corners --.

Signed and Sealed this

Twelfth Day of November, 2002

*Attest:*

*Attesting Officer*

JAMES E. ROGAN
*Director of the United States Patent and Trademark Office*